United States Patent
Choi et al.

(10) Patent No.: US 9,846,651 B2
(45) Date of Patent: Dec. 19, 2017

(54) COMPUTING SYSTEM WITH CACHE MANAGEMENT MECHANISM AND METHOD OF OPERATION THEREOF

(71) Applicant: Samsung Electronics Co., Ltd., Suwon-si, Gyeonggi-Do (KR)

(72) Inventors: Inseok Stephen Choi, San Jose, CA (US); Byoung Young Ahn, San Jose, CA (US); Yang Seok Ki, Palo Alto, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 78 days.

(21) Appl. No.: 15/083,099

(22) Filed: Mar. 28, 2016

(65) Prior Publication Data

US 2017/0212841 A1    Jul. 27, 2017

Related U.S. Application Data (60) Provisional application No. 62/286,193, filed on Jan. 22, 2016.

(51) Int. Cl.
| | |
|---|---|
| *G06F 13/00* | (2006.01) |
| *G06F 12/0891* | (2016.01) |
| *G06F 12/02* | (2006.01) |
| *G06F 12/08* | (2016.01) |
| *G06F 12/121* | (2016.01) |

(52) U.S. Cl.
CPC ...... *G06F 12/0891* (2013.01); *G06F 12/0253* (2013.01); *G06F 12/08* (2013.01); *G06F 12/121* (2013.01); *G06F 2212/222* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 8,433,695 B2 | 4/2013 | Wu et al. | |
| 8,725,951 B2 | 5/2014 | Busch et al. | |
| 8,904,047 B1 | 12/2014 | Kornfeld et al. | |
| 2012/0072656 A1 | 3/2012 | Archak et al. | |
| 2013/0282965 A1* | 10/2013 | Sengupta | G06F 12/0866 711/103 |
| 2015/0242227 A1* | 8/2015 | Nair | G06F 21/60 718/1 |
| 2016/0026392 A1* | 1/2016 | Harris | G06F 9/45504 711/171 |
| 2016/0269502 A1* | 9/2016 | Guerin | G06F 15/17331 |
| 2017/0116130 A1* | 4/2017 | Sundaravaradan | G06F 12/0888 |

* cited by examiner

*Primary Examiner* — Brian Peugh
(74) *Attorney, Agent, or Firm* — IP Investment Law Group (57) ABSTRACT

A computing system includes a memory storage unit, having memory blocks, configured as a memory cache to store values of key-value pairs; and a device control unit, coupled to the memory storage unit, configured to: identify eviction targets from key-value eviction candidates in a key-value registry based on an eviction policy; calculate an associated eviction count of associated eviction candidates within the same instance of the memory blocks as the eviction targets; select an erase block as the memory blocks associated with the highest value of the associated eviction count; and interface with the memory storage unit to perform an erase operation on the erase block.

20 Claims, 4 Drawing Sheets

COMPUTING SYSTEM WITH CACHE MANAGEMENT MECHANISM AND METHOD OF OPERATION THEREOF

CROSS-REFERENCE TO RELATED APPLICATION

This application claims the benefit of U.S. Provisional Patent Application Ser. No. 62/286,193 filed Jan. 22, 2016, and the subject matter thereof is incorporated herein by reference thereto.

TECHNICAL FIELD

An embodiment of the present invention relates generally to a computing system, and more particularly to a system for cache management.

BACKGROUND

Modern consumer and industrial electronics, especially cloud computing devices and web servers, are providing increasing levels of functionality to support modern life, including analysis of big data and real time web applications. Research and development in the existing technologies can take a myriad of different directions.

As users become more empowered with the growth of information processing technology, new and old paradigms begin to take advantage of this new space. One electronics based growth space, where processing high volumes of information is quintessential, is in big data analysis, such as with non-Structured Query Language ("NoSQL" or "Non-SQL") based systems. However, back end databases and computing servers, such as web caching servers, that host the information are costly and may become bottlenecks in throughput of the information. Thus, scalable data servers with high input/output per second (IOPS) throughput has eluded those of skill in the art.

Thus, a need still remains for a computing system with memory management mechanism for cache management. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a system including a memory storage unit, having memory blocks, configured as a memory cache to store values of key-value pairs; and a device control unit, coupled to the memory module, configured to: identify eviction targets from key-value eviction candidates in a key-value registry based on an eviction policy; calculate an associated eviction count of associated eviction candidates within the same instance of the memory blocks as the eviction targets; select an erase block as the memory block associated with the highest value of the associated eviction count; and interface with the memory storage unit to perform an erase operation on the erase block.

An embodiment of the present invention provides a method including: storing values of key-value pairs in memory blocks of a memory storage unit, the memory storage unit configured as a memory cache; identifying eviction targets from key-value eviction candidates in a key-value registry based on an eviction policy; calculating an associated eviction count of associated eviction candidates within the same instance of the memory blocks as the eviction targets; and selecting an erase block as the memory block associated with the highest value of the associated eviction count.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

Figure 1:
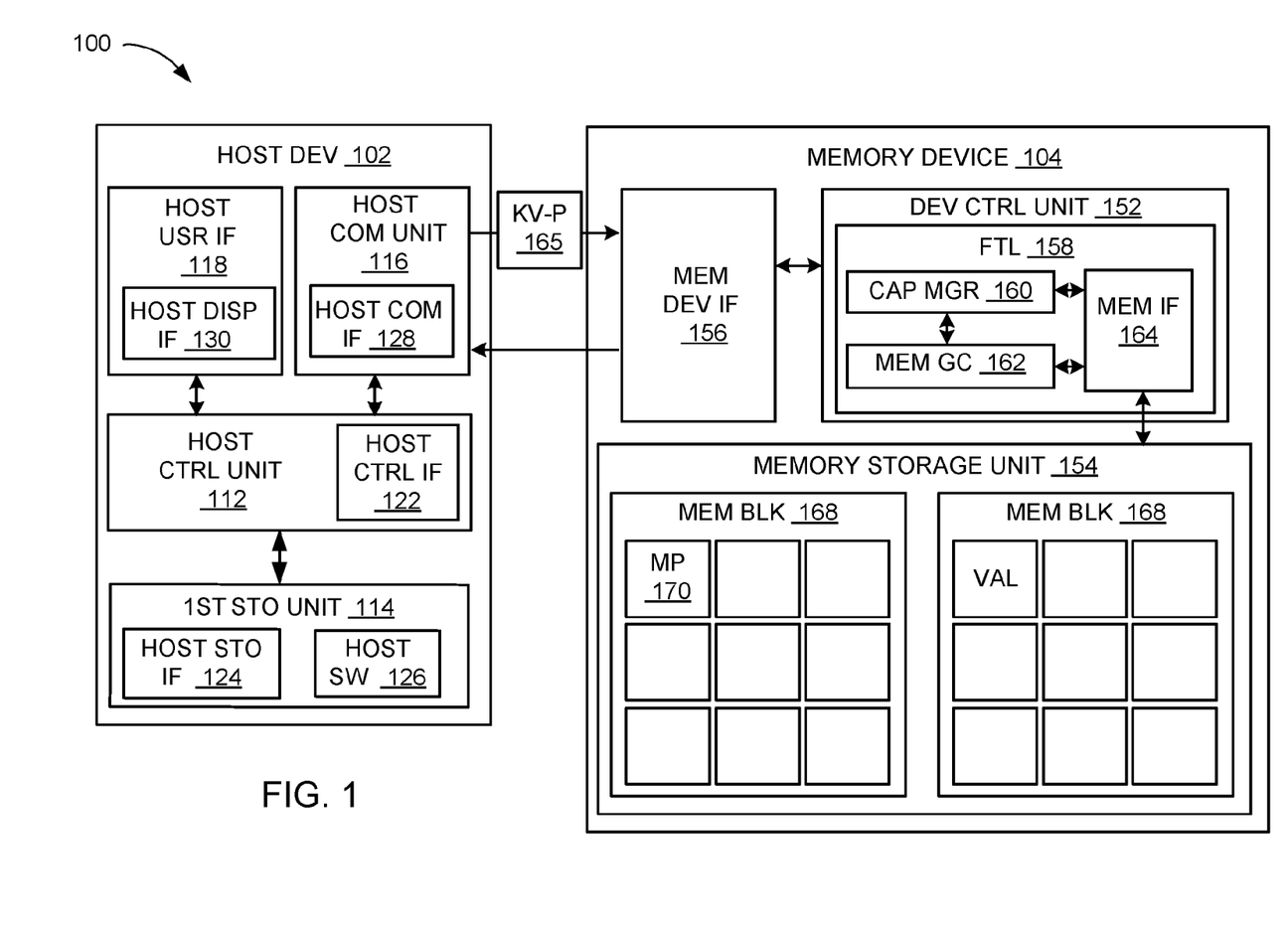
FIG. 1 is a computing system with cache management mechanism in an embodiment of the present invention.

Referring now to FIG. 1, therein is shown a computing system 100 with a memory management mechanism in an embodiment of the present invention. FIG. 1 depicts an example block diagram of the computing system 100. The computing system 100 can include a host device 102 and a memory device 104. The block diagram depicts a memory device 104 coupled to a host device 102.

The host device 102 can be a computing device, such as a server, laptop computer, or desktop computer. In another example, the host device 102 can include a variety of centralized or decentralized computing devices. As a specific example, the host device 102 can be a grid-computing resources, a virtualized computer resource, cloud computing resource, peer-to-peer distributed computing devices, a web server, or a combination thereof.

The host device 102 can be a device capable of supporting or implementing a key-value store or database, such as NoSQL databases, and executing big data and real-time web applications, or a combination thereof.

The host device 102 can include units, such as hardware components, including a host control unit 112, a host storage unit 114, a host communication unit 116, and a host user interface 118. The host control unit 112 can include a host control interface 122. The host control unit 112 can execute a host software 126 to provide the intelligence of the host device 102.

The host control unit 112 can be implemented in a number of different manners of hardware circuitry. For example, the host control unit 112 can be a processor, an application specific integrated circuit (ASIC) an embedded processor, a microprocessor, a hardware control logic, a hardware finite state machine (FSM), a digital signal processor (DSP), a programmable logic device (PLD) or a combination thereof. The host control unit 112 can include dedicated circuitry, such as a memory controller, memory chip controller, or memory controller unit, for memory allocation operations and flow of information.

The host control interface 122 can be used for communication between the host control unit 112 and other units in the host device 102. The host control interface 122 can also be used for communication that is external to the host device 102, including the memory device 104.

The host control interface 122 can receive information from the other units or from external sources, or can transmit information to the other units or to external destinations. The external sources and the external destinations refer to sources and destinations external to the host device 102.

The host control interface 122 can be implemented in different ways with hardware circuitry and can include different implementations depending on which internal units or external units are being interfaced with the host control interface 122. For example, the host control interface 122 can be implemented with a pressure sensor, an inertial sensor, a microelectromechanical system (MEMS), optical circuitry, waveguides, wireless circuitry, wireline circuitry, or a combination thereof.

The host storage unit 114 can store the host software 126. The host storage unit 114 can also store the relevant information, such as key-value information.

The host storage unit 114 can be implemented with hardware circuitry including a volatile memory, a nonvolatile memory, an internal memory, an external memory, or a combination thereof. For example, the host storage unit 114 can be a nonvolatile storage such as non-volatile random access memory (NVRAM), Flash memory, disk storage, resistive random-access memory (ReRAM), Phase-change memory (PRAM), or a volatile storage such as static random access memory (SRAM). As a specific example, the host storage unit 114 can include random access memory (RAM), synchronous dynamic access memory (SDRAM,) in the form of hardware modules, such as dual in-line memory modules (DIMM).

The host storage unit 114 can include a host storage interface 124. The host storage interface 124 can be used for communication between other units in the host device 102. The host storage interface 124 can also be used for communication that is external to the host device 102.

The host storage interface 124 can receive information from the other units or from external sources, or can transmit information to the other units or to external destinations. The external sources and the external destinations refer to sources and destinations external to the host device 102.

The host storage interface 124 can include different implementations depending on which units or external units are being interfaced with the host storage unit 114. The storage interface 124 can be implemented with technologies and techniques similar to the implementation of the host control interface 122.

The host communication unit 116 can enable external communication to and from the host device 102. For example, the host communication unit 116 can permit the host device 102 to communicate with the memory device 104 or other attachments, such as a peripheral device or a computer desktop. The host communication unit 116 can include active and passive components, such as microelectronics, filters, modulators, demodulators, detectors, decoders, a base band modem, or an antenna.

The host communication unit 116 can include a host communication interface 128. The host communication interface 128 can be used for communication between the host communication unit 116 and other units in the host device 102. The host communication interface 128 can receive information from the other units or can transmit information to the other units.

The host communication interface 128 can include different implementations depending on which units are being interfaced with the host communication unit 116. The host communication interface 128 can be implemented with technologies and techniques similar to the implementation of the host control interface 122.

The host user interface 118 allows a user (not shown) to interface and interact with the host device 102. The host user interface 118 can include an input device and an output device. Examples of the input device of the host user interface 118 can include a keypad, a touchpad, soft-keys, a keyboard, a microphone, an infrared sensor for receiving remote signals, or any combination thereof to provide data and communication inputs.

The host user interface 118 can include a display interface 130. The display interface 130 can include connectivity for a display, a projector, a video screen, a speaker, or any combination thereof.

The host control unit 112 can operate the host user interface 118 to display information generated by the computing system 100. The host control unit 112 can also execute the host software 126 for the other functions of the computing system 100.

The units in the host device 102 can work individually and independently of the other units. The host device 102 can work individually and independently from the memory device 104.

The memory device 104 is standalone memory storage hardware based on non-volatile memory technology. For example the memory device 104 can be a solid state memory device configured to operate as part of a multi-level cache system. The memory device 104 can be configured to operate as a caching device in a multi-tier caching system. For example, the memory device 104 can implement capacity management and eviction operations independent of host device 102. The memory device can include a device control unit 152, a memory storage unit 154, and a memory device interface 156.

The device control unit 152 can be implemented in a number of different manners of hardware circuitry. For example, the device control unit 152 can be a processor, an application specific integrated circuit (ASIC) an embedded processor, a microprocessor, a hardware control logic, a hardware finite state machine (FSM), a digital signal processor (DSP), or a combination thereof. The device control unit 152 can include dedicated circuitry, such as a memory controller, memory chip controller, or memory controller unit, for memory allocation operations and flow of information.

The device control unit 152 can implement firmware for operation of the memory device 104. For example, the device control unit 152 can operate a flash translation layer 158. The flash translation layer 158 is a component for implementing mechanisms and processes for operation of the memory device 104, such as read, programming, and mapping operations. The flash translation layer 158 can include firmware components, such as a capacity manager 160, a memory garbage collector 162, and a memory input/output (I/O) interface 164.

The capacity manager 160 is a component that monitors the status and activity of key-value pairs 165 within the memory device 104. For example, the capacity manager 160 can processes the values of incoming instances of key-value pairs 165 for storage in the memory storage unit 154. In another example, the capacity manager 160 can identify candidates for erase operations. Each of these operations will be discussed below.

The memory garbage collector 162 is component for handling erase operations within the memory storage unit 154. For example, memory garbage collector 162 can identify and erase memory blocks based on information received from the capacity manager 160.

The memory I/O interface 164 is a component for handling requests to access the memory storage unit 154. For example, the memory I/O interface 164 can process read, programming, or erase operations for the memory storage unit 154. As a specific example, the memory I/O interface 164 can access the memory storage unit 154 to program the memory pages 170 with a value (VAL) of the key-value pairs 165 received by the capacity manager 160. In another specific example, the memory I/O interface 164 can access the memory storage unit 154 to retrieve the value of the key-value pairs 165 for a read operation. In a further specific example, the memory I/O interface 164 can access the memory blocks 168 within the memory storage unit 154 to execute an erase operation. The capacity manager 160, the memory garbage collector 162, and the memory I/O interface 164 operate independently or can communicate with one another for operation of the memory device 104.

The memory storage unit 154 is a non-transitory computer readable medium. For example, memory storage unit 154 can be a non-volatile memory such as flash memory, including NAND flash memory, ferroelectric random access memory (FRAM), or magnetoresistive random-access memory (MRAM), and the like. The memory storage unit 154 can include memory components and sub-components, such as planes (not shown), memory blocks 168, and memory pages 170. As an example, the memory pages 170 can be the smallest segment in the memory storage unit 154 that can undergo a programming operation. The memory blocks 168 can include a number of the memory pages 170.

The memory blocks 168 can be the smallest segment in the memory storage unit 154 that can undergo an erase operation.

The memory device interface 156 is for providing connection to devices external to the memory device 104. For example, the memory device interface 156 can provide the hardware for direct or indirect connection to the host device 102. As a specific example, the memory device interface 156 can provide direct attachment for the memory device 104 to the host device 102 through a peripheral component interconnect or peripheral component interconnect express (PCIe) connection. In another specific example, the memory device interface 156 can provide connection between the memory device 104 and the host device 102 on a network, such as a local area network (LAN), metropolitan area network (MAN), or wide-area network (WAN) through wired or wireless commination. Examples of wired communication can include communication through digital subscriber line (DSL), fiber optic connection, or an Ethernet connection with interfaces for a category (Cat) 5, Cat 5e, or Cat 6 connection. Satellite communication, cellular communication, Bluetooth, Infrared Data Association standard (IrDA), and wireless fidelity (WiFi) are examples of wireless communication.

Figure 2:
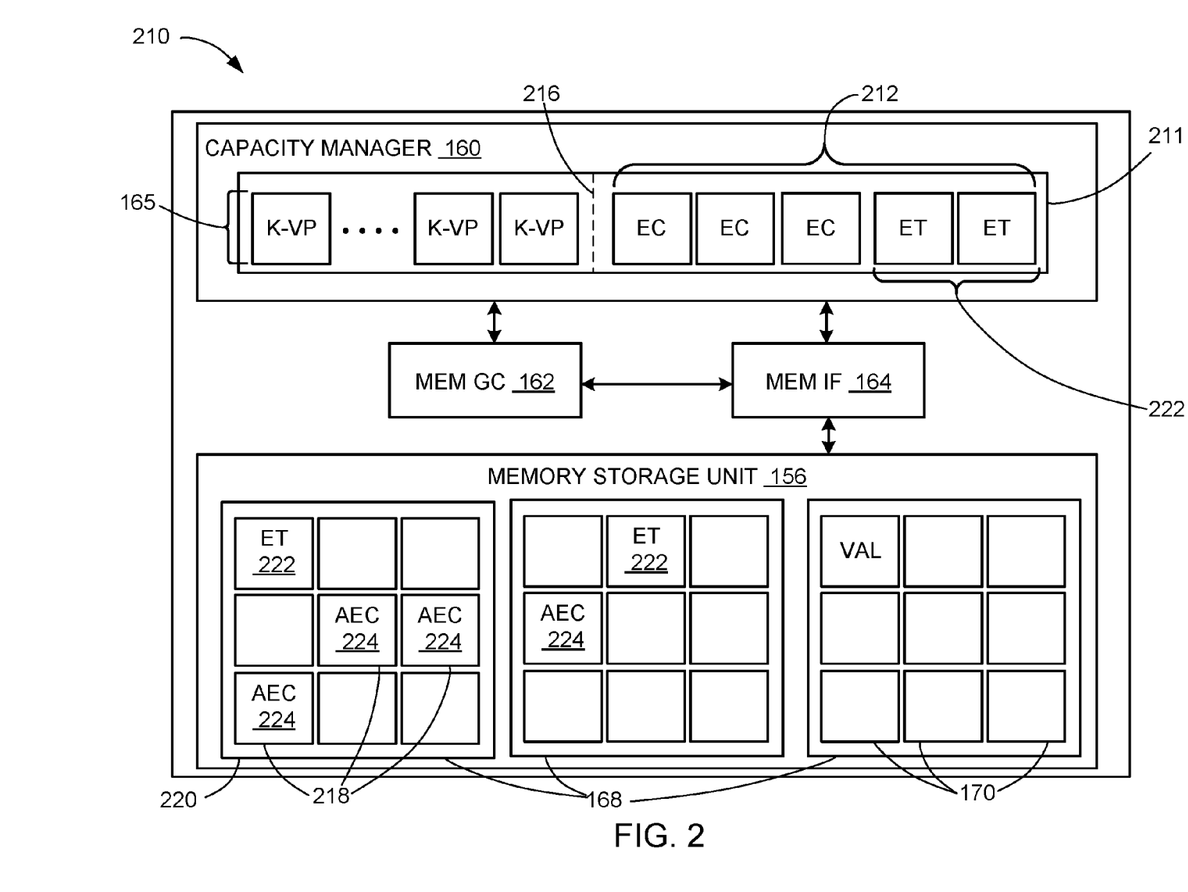
FIG. 2 is an example of a cache eviction process for the computing system.

Referring now to FIG. 2, therein is shown an example of a cache eviction process 210 for the computing system 100. The cache eviction process 210 is an object selection and eviction operation. The cache eviction process 210 enables the memory device 104 to operate as a standalone caching device. The cache eviction process 210 can be executed by the device control unit 152 on the memory device 104 of FIG. 1 and implemented with the capacity manager 160, memory garbage collector 162, the memory I/O interface 164, or a combination thereof, as described below.

The cache eviction process 210 can be illustrated with a key-value registry 211 of the capacity manager 160. The key-value registry 211 is a dictionary of information associated with the key-value pairs 165 of the memory device 104. Additional details of the key-value registry 211 will be discussed below. The key-value registry 211 can track key-value eviction candidates 212 and eviction targets 222.

The key-value eviction candidates 212 are key-value pairs 165 that meet an eviction criteria. For example, the key-value eviction candidates 212 can be instances of the key-value pairs 165 having eviction criteria that exceed an eviction threshold 216. The eviction criteria and the eviction threshold 216 can be based on eviction policies according to factors such as frequency of access, time in storage, and most recent activity, amongst others, which will be discussed further below. In the cache eviction process 210, the capacity manager 160 can identify the key-value eviction candidates 212 from the key-value pairs 165 of the key-value registry 211. As a specific example, the capacity manager 160 can identify the key-value eviction candidates 212 as the instances of the key-value pairs 165 exceeding the eviction threshold 216 (however that may be measured), which is illustrated as the dashed line of FIG. 2.

The eviction targets 222 are instances of the key-value eviction candidates 212 selected for eviction according to the policies for eviction. As an example, for a policy based on frequency of access, the eviction targets 222 can be selected as the instances of the key-value eviction candidates 212 with the lowest frequencies of access. In another the example, for a policy based on most recent access, the eviction targets 222 can be selected as the instances of the key-value eviction candidates 212 with the longest period since last access. In a further example, for the policy based on time in storage, the eviction targets 222 can be selected as the instances of the key-value eviction candidates 212 with the longest periods of time stored in the memory storage unit 156. The selection of the eviction targets 222 from the key-value eviction candidates 212 will be discussed in detail below.

In the cache eviction process 210, the memory garbage collector 162 can select an erase block 220, which is an instance of the memory blocks 168 within the memory storage unit 154 that includes one of the eviction targets 222. For example, the memory garbage collector 162 can calculate an associated eviction count 218 of associated eviction candidates 224 for the eviction targets 222. The associated eviction candidates 224 are the key-value eviction candidates 212 that are within the same instance of the memory blocks 168 as one of the eviction targets 222. To further the example, the memory garbage collector 162 can select the erase block 220 as the memory blocks 168 with the eviction targets 222 having the highest value of the associated eviction count 218.

For illustrative purposes, FIG. 2 is shown with two of the eviction targets 222, although it is understood that a different number of eviction targets 222 can be identified in the cache eviction process 210. The details of the cache eviction process 210, including the determination of the key-value eviction candidates 212, the selection of the erase block 220 and associated steps, will be discussed in detail below.

Figure 3:
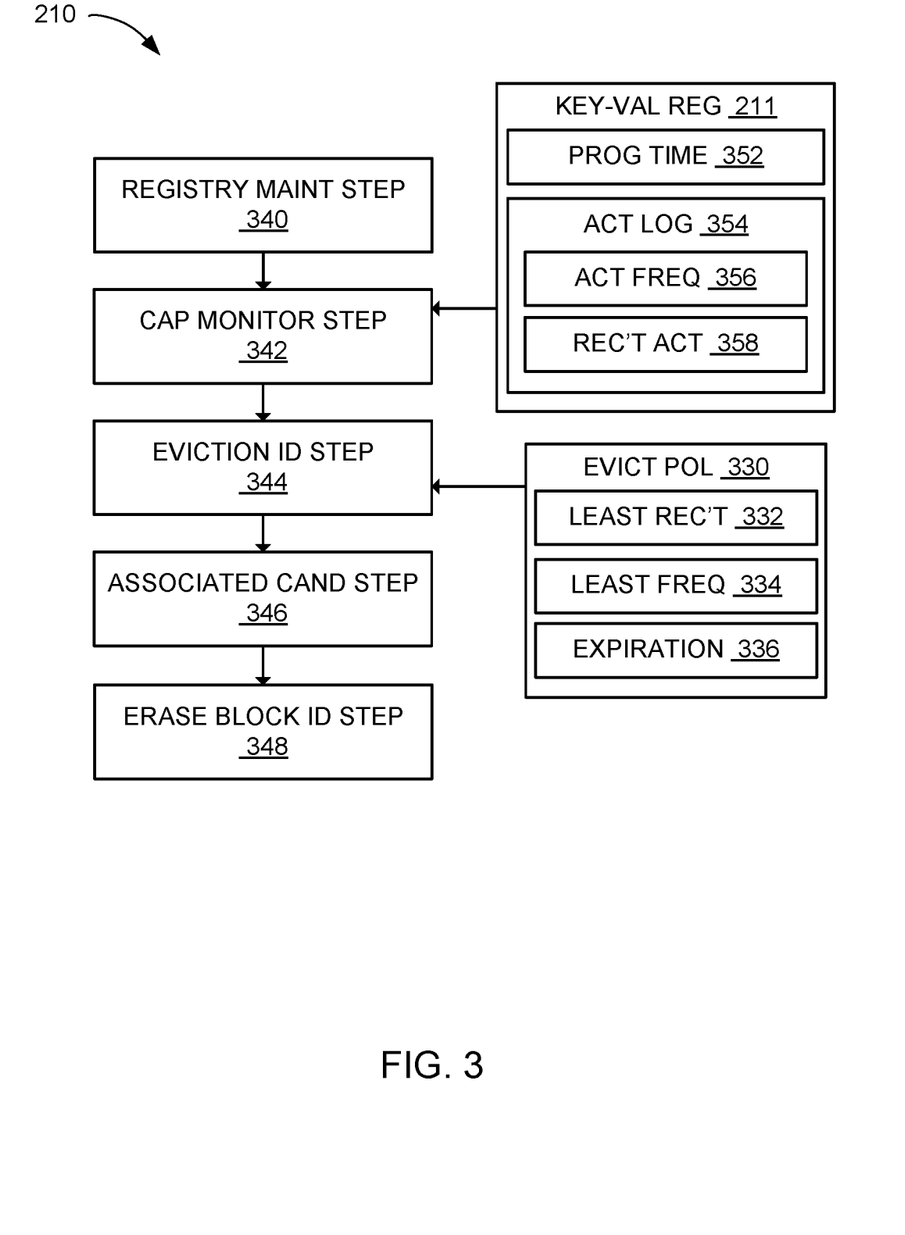
FIG. 3 is an exemplary flow chart for the computing system.

Referring now to FIG. 3, therein is shown a flow chart for the computing system 100. The memory management mechanism of the computing system 100 can be implemented in a number of different ways. One example of the implementation is described in the flow chart below, which depicts the cache eviction process 210 of FIG. 2 for the memory device 104 of FIG. 1. In general, the cache eviction process 210 can be implemented autonomously based on an eviction policy 330. More specifically, the cache eviction process 210 can be initiated by the device control unit 152 through the capacity manager 160 of FIG. 2 absent external commands, such as those from the host device 102 of FIG. 1.

The eviction policy 330 is a rule for determining candidates for eviction of data from a memory unit. For example, the eviction policy 330 can identify the key-value pairs 165 of FIG. 1 as the key-value eviction candidates 212 of FIG. 2 based on the frequency the key-value pairs 165 are accessed, how recently the key-value pairs 165 has been accessed, the total time the value of the key-value pairs 165 have been stored in the memory storage unit 154, or a combination thereof. The eviction policy 330 can include a least recent policy 332, a least frequent policy 334, an expiration policy 336, or a combination thereof.

The least recent policy 332 is an eviction policy based on how recently an instance of the key-value pairs 165 has been accessed. For example, the least recent policy 332 can target the key-value pairs 165 as the key-value eviction candidates 212 with the longest duration of time since last access among the values of the key-value pairs 165 in the memory storage unit 154.

The least frequent policy 334 is an eviction policy based on how frequently an instance of the key-value pairs 165 is accessed. For example, the least frequent policy 334 can target the key-value pairs 165 as the key-value eviction candidates 212 that are least frequent access among values of the key-value pairs 165 in the memory storage unit 154.

The expiration policy 336 is a policy based on time in the memory storage unit 154. For example, the expiration policy 336 can target the key-value pairs 165 having values that have been stored in the memory storage unit 154 for the greatest period of time relative to the other instances of the key-value pairs 165.

The flow for the cache eviction process 210 can include a registry maintenance step 340, a capacity monitoring step 342, an eviction identification step 344, an associated candidate step 346, and an erase block identification step 348. The flow for the cache eviction process 210 of the computing system 100 can be begin with the registry maintenance step 340. The registry maintenance step 340 is for maintaining and updating a registry of key-value stores in the storage device.

In the registry maintenance step 340, the capacity manager 160 can maintain the key-value registry 211. The key-value registry 211 can include registry information associated with each of the key-value pairs 165. For example, the key-value registry 211 can include information about the key and location of the value of the key-value pair 165 stored in the memory storage unit 154 of FIG. 1. In another example, the key-value registry 211 can include a program timestamp 352, an activity log 354, or a combination thereof for each of the key-value pairs 165.

The program timestamp 352 is the point in time that the value of an instance of the key-value pairs 165 was programmed into the memory storage unit 154. The activity log 354 is a record of access to the value of the key-value pairs 165.

The activity log 354 can track an activity frequency 356 and a recent activity 358 associated with the key-value pairs 165. The activity frequency 356 is a measure of the frequency that the key-value pairs 165 is accessed. The recent activity 358 is a record for the last time the value of key-value pairs 165 was accessed.

The capacity manager 160 can maintain the key-value registry 211 by monitoring the key-value pairs 165. For example, the capacity manager 160 can update the key-value registry 211 in association with a programming or erase operation, such as when the value of a new instances of the key-value pairs 214 are received by the memory device 104 or when the key-value pairs 165 are erased from memory device 104. As a specific example the capacity manager 160 can update the key-value registry 211, including the activity log 354, by adding the program timestamp 352 to the new instances of the key-value pairs 165 received from the host device 102 for storage in the memory storage unit 154. In another specific example, the capacity manager 160 can also maintain the key-value registry 211 by removing key-value pairs 165 from the key-value registry 211 following an erase operation. The device control unit 152 can utilize the capacity manager 160 to execute the registry maintenance step 340 as described above.

The flow can continue to the capacity monitoring step 342. The capacity monitoring step 342 is for monitoring the registry of the key-value pairs 165 to identify candidates for eviction. The capacity monitoring step 342 can identify the key-value eviction candidates 212 according to the eviction policy 330. More specifically, the capacity monitoring step 342 can determine the eviction threshold 216 of FIG. 2 based on the eviction policy 330.

For the least frequent policy 334, the eviction threshold 216 can correspond to the activity frequency 356 of the key-value pairs 165. For example, the key-value pairs 165 having the activity frequency below the eviction threshold 216 can be identified as the key-value eviction candidates 212.

For the least recent policy 332, the eviction threshold 216 can correspond to the recent activity 358 of the key-value pairs 165. For example, the key-value pairs 165 having the recent activity 358 below the eviction threshold 216 can be identified as the key-value eviction candidates 212.

For the expiration policy 336, the eviction threshold 216 can correspond to the program timestamp 352. For example, the key-value pairs 165 having the program timestamp 352 that exceeds the eviction threshold 216 can be identified as the key-value eviction candidates 212. The device control unit 152 can utilize the capacity manager 160 to execute the capacity monitoring step 342 as described above.

The flow can continue to the eviction identification step 344. The eviction identification step 344 is for identifying the eviction targets 222 of FIG. 2. For example, in the eviction identification step 344, the memory garbage collector 162 can select the eviction targets 222 from the key-value eviction candidates 212 based on the eviction policy 330.

In the example of the least frequent policy 334, the memory garbage collector 162 can identify one or more of the key-value eviction candidates 212 with the least amount of activity among the key-value pairs 165 in the key-value registry 211 as the eviction targets 222. In the example of the least recent policy 332, the memory garbage collector 162 can identify one or more of the key-value eviction candidates 212 that has had the longest periods of inactivity among the key-value pairs 165 in the key-value registry 211 as the eviction targets 222. In the example of the expiration policy 336, the memory garbage collector 162 can identify one or more of the key-value eviction candidates 212 that have been in in the memory device 104 for the longest period of time, relative to the other instances of the key-value pairs 165 in the key-value registry 211, as the eviction targets 222. The device control unit 152 can utilize the memory garbage collector 162 to execute the eviction identification step 344 as described above.

The flow can continue to the associated candidate step 346. The associated candidate step 346 is for identifying the associated eviction candidates 224 and determining the associated eviction count 218 of FIG. 2 for the eviction targets 222. In the associated candidate step 346, the capacity manager 160 can identify the associated eviction candidates 224 as the key-value eviction candidates 212 that are in the same instance of the memory blocks 168 as the eviction targets 222. For each instance of the eviction targets 222, the capacity manager 160 can calculate the associated eviction count 218 as the total number of the associated eviction candidates 224 of the particular instance of the eviction targets 222. The device control unit 152 can utilize the capacity manager 160 to execute the associate candidate step 346 as described above.

The flow can continue to the erase block identification step 348. The erase block identification step 348 is for identification of the optimum block of memory for an erase operation. In the erase block identification step 348, the memory garbage collector 162 can select the erase block 220 from the memory blocks 168 in the memory storage unit 154 based on the associated eviction count 218. For example, the memory garbage collector 162 can select the erase block 220 as the memory blocks 168 associated with the highest value of the associated eviction count 218. The device control unit 152 can utilize the memory garbage collector 162 to execute the erase block identification step 348 as described above. Further, the memory garbage collector 162 can communicate with the memory I/O interface 164 to issue an erase command for or perform an erase operation on the erase block 220.

It has been discovered that the eviction policy for self-eviction of the key-value pairs 165 enables a non-volatile memory device, such as the memory device 104, to better function as a caching device.

Figure 4:
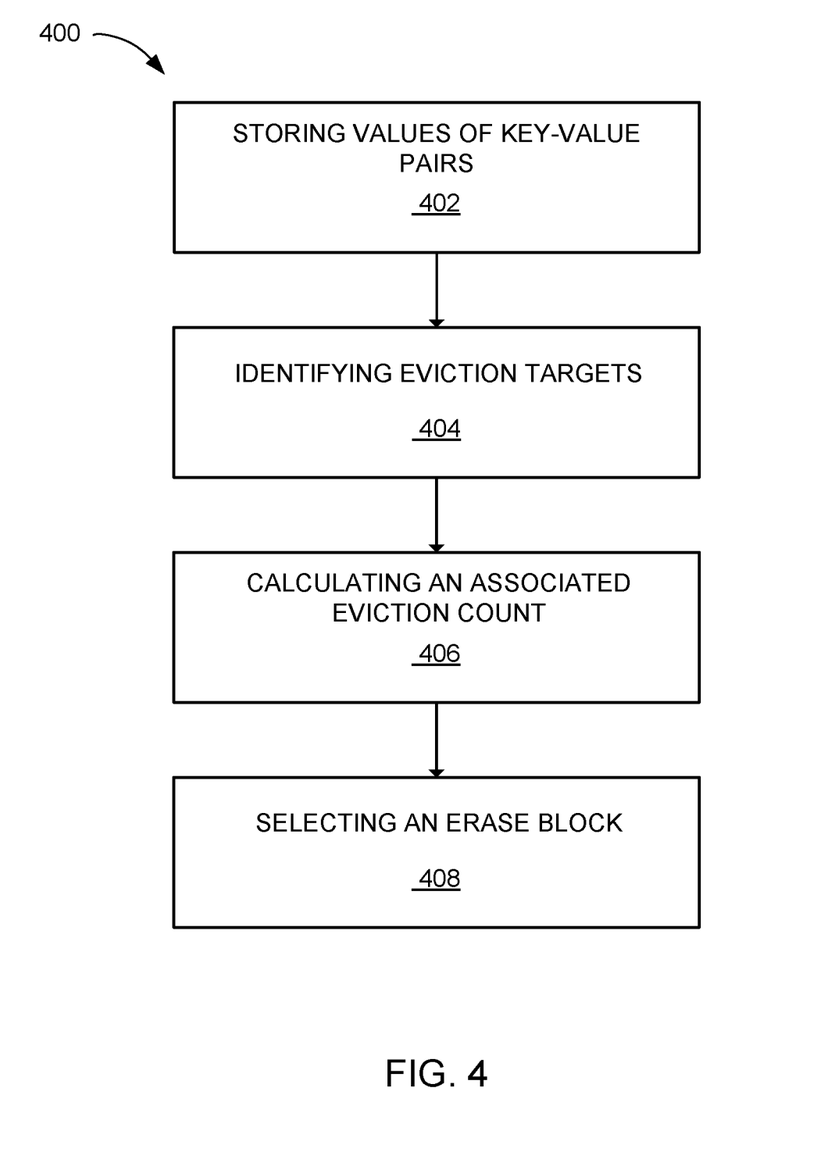
FIG. 4 is a flow chart of a method of operation of a computing system in an embodiment of the present invention.

Referring now to FIG. 4, therein is shown a flow chart of a method 400 of operation of a computing system 100 in an embodiment of the present invention. The method 400 includes: storing values of key-value pairs in memory blocks of a memory storage unit, the memory storage unit configured as a memory cache in a block 402; identifying eviction targets from key-value eviction candidates in a key-value registry based on an eviction policy in a block 404; calculating an associated eviction count of associated eviction candidates within the same instance of the memory blocks as the eviction targets in a block 406; and selecting an erase block as the memory block associated with the highest value of the associated eviction count in a block 408. The blocks of the method 400 can be implemented by units of the memory device 104 of FIG. 1, such as the device control unit 152 of FIG. 1 and the memory storage unit 154 of FIG. 1 as described in the flows of FIG. 3 above. For example, the method of block 402 can be implemented by device control unit 152 through the memory I/O interface 164 of FIG. 1. In another example, the method of block 404 can be executed in the eviction identification step 344 of FIG. 3. In a further example, the method of block 406 can be executed in the associated candidate step 346 of FIG. 3. In yet a further example, the method of block 408 can be executed in the erase block identification step 348 of FIG. 3.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:
1. A computing system comprising:
a memory storage unit, having memory blocks, configured as a memory cache to store values of key-value pairs; and
a device control unit, coupled to the memory storage unit, configured to:
identify eviction targets from key-value eviction candidates in a key-value registry based on an eviction policy;
calculate an associated eviction count of associated eviction candidates within the same instance of the memory blocks as the eviction targets;
select an erase block as the memory blocks associated with the highest value of the associated eviction count; and interface with the memory storage unit to perform an erase operation on the erase block.

2. The system as claimed in claim 1 wherein the device control unit is configured to identify the key-value eviction candidates based on the eviction policy including a least recent policy.

3. The system as claimed in claim 1 wherein the device control unit is configured to identify the key-value eviction candidates based on the eviction policy including a least frequent policy.

4. The system as claimed in claim 1 wherein the device control unit is configured to identify the key-value eviction candidates based on the eviction policy including an expiration policy.

5. The system as claimed in claim 1 wherein the device control unit is configured to initiate unsolicited eviction of the value of key-value pairs from the memory storage unit.

6. The system as claimed in claim 1 wherein the device control unit is configured to maintain the key-value registry of the key-value pairs including a program timestamp for each of the key-value pairs in the key-value registry.

7. The system as claimed in claim 1 wherein the device control unit is configured to maintain the key-value registry of the key-value pairs including an activity log for each of the key-value pairs in the key-value registry.

8. The system as claimed in claim 1 wherein the device control unit is configured select the erase block for a memory garbage collector.

9. The system as claimed in claim 1 further comprising a memory device interface configured receive the value of the key-value pair from a host device.

10. The system as claimed in claim 1 wherein the memory storage unit includes a NAND flash memory.

11. A method of operation of a computing system comprising:
    storing values of key-value pairs in memory blocks of a memory storage unit, the memory storage unit configured as a memory cache;
    identifying eviction targets from key-value eviction candidates in a key-value registry based on an eviction policy;
    calculating an associated eviction count of associated eviction candidates within the same instance of the memory blocks as the eviction targets; and
    selecting an erase block as the memory blocks associated with the highest value of the associated eviction count.

12. The method as claimed in claim 11 wherein identifying the eviction targets based on an eviction policy includes a least recent policy.

13. The method as claimed in claim 11 wherein identifying the eviction targets based on an eviction policy includes a least frequent policy.

14. The method as claimed in claim 11 wherein identifying the eviction targets based on an eviction policy includes an expiration policy.

15. The method as claimed in claim 11 further comprising initiating unsolicited eviction of the values of the key-value pairs.

16. The method as claimed in claim 11 further comprising maintaining the key-value registry of the key-value pairs including a program timestamp for each of the key-value pairs in the key-value registry.

17. The method as claimed in claim 11 further comprising maintaining the key-value registry of the key-value pairs including an activity log for each of the key-value pairs in the key-value registry.

18. The method as claimed in claim 11 wherein selecting the erase block includes selecting the erase block for a memory garbage collector.

19. The s method as claimed in claim 11 further comprising receiving the value of the key-value pairs from a host device.

20. The method as claimed in claim 11 wherein storing the key-value pairs as the key-value stores in a NAND flash memory.

* * * * *